United States Patent
Sugiyama et al.

(10) Patent No.: US 11,370,434 B2
(45) Date of Patent: Jun. 28, 2022

(54) INTER-VEHICLE COMMUNICATION DEVICE AND DRIVING ASSISTANCE DEVICE

(71) Applicant: CLARION CO., LTD., Saitama (JP)

(72) Inventors: Yoshikazu Sugiyama, Tokyo (JP); Tomonori Tanaka, Ageo (JP); Keisuke Mutou, Tokyo (JP)

(73) Assignee: CLARION CO., LTD., Saitama (JP)

( * ) Notice: Subject to any disclaimer, the term of this patent is extended or adjusted under 35 U.S.C. 154(b) by 255 days.

(21) Appl. No.: 16/637,228

(22) PCT Filed: Apr. 26, 2018

(86) PCT No.: PCT/JP2018/017049
§ 371 (c)(1),
(2) Date: Feb. 6, 2020

(87) PCT Pub. No.: WO2019/030992
PCT Pub. Date: Feb. 14, 2019

(65) Prior Publication Data
US 2020/0369275 A1    Nov. 26, 2020

(30) Foreign Application Priority Data
Aug. 7, 2017    (JP) .............................. JP2017-152617

(51) Int. Cl.
*B60W 30/165*    (2020.01)
*G08G 1/16*    (2006.01)

(52) U.S. Cl.
CPC ........... *B60W 30/165* (2013.01); *G08G 1/161* (2013.01); *G08G 1/166* (2013.01); *B60W 2556/65* (2020.02)

(58) Field of Classification Search
CPC ...... B60W 30/00; B60W 30/14; B60W 30/16; B60W 30/165; B60W 2556/00;
(Continued)

(56) References Cited

U.S. PATENT DOCUMENTS

| | | | |
|---|---|---|---|
| 2008/0186076 A1* | 8/2008 | Kawama | G06G 7/18 327/336 |
| 2009/0125203 A1* | 5/2009 | Lindqvist | G08G 1/166 701/96 |

(Continued)

FOREIGN PATENT DOCUMENTS

| | | |
|---|---|---|
| JP | 2011-213294 A | 10/2011 |
| JP | 2013-008302 A | 1/2013 |

(Continued)

OTHER PUBLICATIONS

Extended European Search Report dated Apr. 1, 2021 for European Patent Application No. 18844026.7.
(Continued)

*Primary Examiner* — Geepy Pe
*Assistant Examiner* — Michael Allen Brace, Jr.
(74) *Attorney, Agent, or Firm* — Volpe Koenig

(57) ABSTRACT

An inter-vehicle communication and driving assistance device performs wireless communication with other vehicles, and includes an inter-vehicle communication unit including a reception level detection unit, a position information reception unit, and an arithmetic processing unit. The arithmetic processing unit calculates inter-vehicle distances to other vehicles using latitude and longitude information of the other vehicles and the own vehicle, receives a position error radius, and acquires a reception level from the other vehicles. When a difference between the inter-vehicle distances is smaller than position error radius, a vehicle with a larger reception level is determined as a vehicle closer to the own vehicle. When the difference between the inter-vehicle distances is larger than the position error radius, a vehicle with a smaller inter-vehicle distance is determined as a vehicle closer to the own vehicle, and a distance to a leading vehicle is calculated.

11 Claims, 15 Drawing Sheets

(58) Field of Classification Search
CPC .......... B60W 2556/45; B60W 2556/65; G08G 1/00; G08G 1/16; G08G 1/161; G08G 1/166
See application file for complete search history.

(56) References Cited

U.S. PATENT DOCUMENTS

| | | | |
|---|---|---|---|
| 2010/0256836 A1* | 10/2010 | Mudalige | G08G 1/164 701/2 |
| 2011/0105108 A1* | 5/2011 | Sugiyama | H04B 7/0808 455/422.1 |
| 2012/0330527 A1 | 12/2012 | Kumabe et al. | |
| 2013/0030687 A1 | 1/2013 | Shida | |
| 2013/0278441 A1* | 10/2013 | Rubin | H04W 56/0035 340/905 |
| 2015/0178247 A1 | 6/2015 | Kinoshita et al. | |
| 2017/0102467 A1* | 4/2017 | Nielsen | G01S 19/47 |
| 2018/0053404 A1* | 2/2018 | Horita | G08G 1/16 |
| 2018/0217229 A1* | 8/2018 | Shukla | G01S 17/87 |

FOREIGN PATENT DOCUMENTS

| | | |
|---|---|---|
| JP | 2013-228804 A | 11/2013 |
| JP | 2016-151960 A | 8/2016 |

OTHER PUBLICATIONS

Miucic et al., Experimental Characterization of DSRC Signal Strength Drops, Proceedings of the 12th International IEEE Conference on Intelligent Transportation Systems, pp. 311-315, Oct. 3-7, 2009.
Parker et al., Vehicle Localization in Vehicular Networks, IEEE Vehicular Technology Conference, pp. 1-5, Sep. 2006.
International Search Report for PCT/JP2018/017049, dated Aug. 7, 2018.

* cited by examiner

FIG.4

| VEHICLE ID (HEXADECIMAL) 41a | LATITUDE AND LONGITUDE 41b | RELIABILITY 41c | RSSI (HEXADECIMAL) 41d | ORIENTATION 41e | SPEED[km/H] 41f |
|---|---|---|---|---|---|
| .. | .. | .. | .. | .. | .. |
| 0x1d | Lat-F, Lon-F | 0100 | 0x 7a | East | 50 |
| 0x2b | Lat-FF, Lon-FF | 0100 | 0x e5 | East | 50 |
| .. | .. | .. | .. | .. | .. |

41 RSSI TABLE

FIG.5

42 RELIABILITY TABLE

| POSITIONING ACCURACY[m] | Position Confidence |
|---|---|
| 100 | 0011 |
| 50 | 0100 |
| 20 | 0101 |

42a, 42b

FIG.9 CALCULATION OF DISTANCE TO LEADING VEHICLE

FIG.15

41' RSSI TABLE

| VEHICLE ID(HEXADECIMAL) | LATITUDE AND LONGITUDE | RELIABILITY | RSSI [dBm] | ORIENTATION | MESSAGE COUNTER | INTER-VEHICLE DISTANCE FROM OWN VEHICLE, BASED ON LATITUDE AND LONGITUDE[m] |
|---|---|---|---|---|---|---|
| .. | .. | .. | .. | .. | .. | .. |
| 0x1d | Lat-F, Lon-F | 0100 | -46 | East | 1 | 80 |
| 0x1d | Lat-F, Lon-F | 0100 | -50 | East | 2 | 130 |
| 0x1d | Lat-F, Lon-F | 0100 | -61 | East | 3 | 105 |
| 0x2b | Lat-FF, Lon-FF | 0100 | -55 | East | 1 | 50 |
| .. | .. | .. | .. | .. | .. | .. |

45a — RSSI [dBm]
45b — MESSAGE COUNTER
45c — INTER-VEHICLE DISTANCE FROM OWN VEHICLE, BASED ON LATITUDE AND LONGITUDE[m]

INTER-VEHICLE COMMUNICATION DEVICE AND DRIVING ASSISTANCE DEVICE

TECHNICAL FIELD

The present invention relates to an inter-vehicle communication device that is mounted on an automobile and performs wireless communication with another inter-vehicle communication device and a roadside unit. The present invention claims priority to Japanese Patent Application No. 2017-152617, filed on Aug. 7, 2017, the contents of which are incorporated by reference herein in its entirety in designated states where the incorporation of documents by reference is approved.

BACKGROUND ART

PTL 1 describes a technique that a vehicle on which an inter-vehicle communication device is mounted receives position calculation logic and map information of another vehicle, compares those with position calculation logic and map information of the own vehicle, and performs driving assistance with a higher cooperation degree as more similarities are found therebetween.

CITATION LIST

Patent Literature

PTL 1: JP 2015-118500 A

SUMMARY OF INVENTION

Technical Problem

With the technique described in PTL 1, a map data device of a car navigation system (a large capacity storage device such as a hard disk drive and a solid-state drive) is required, which increases costs.

The present invention has an object to provide a technique for achieving, at a low cost, an inter-vehicle communication device that does not require map data and a driving assistance device using the inter-vehicle communication device.

Solution to Problem

The present application includes a plurality of solutions to at least a part of the problems described above. One example of the solutions is as follows. In order to solve the above-mentioned problem, an inter-vehicle device according to one aspect of the present invention is an inter-vehicle communication device for being mounted on a vehicle and wirelessly communicating with other vehicles, the inter-vehicle communication device including: an inter-vehicle communication unit including a reception level detection unit; a position information reception unit; and an arithmetic processing unit, wherein the arithmetic processing unit calculates a first inter-vehicle distance to a first other vehicle through use of latitude and longitude information on the first other vehicle, which is received by the inter-vehicle communication unit, and latitude and longitude information on an own vehicle of the position information reception unit, receives a first position error radius relating to the first other vehicle from the first other vehicle, and acquires a first reception level from the first other vehicle, which is detected by the reception level detection unit, the arithmetic processing unit calculates a second inter-vehicle distance to a second other vehicle through use of latitude and longitude information on the second other vehicle, which is received by the inter-vehicle communication unit, and the latitude and longitude information on the own vehicle of the position information reception unit, receives a second position error radius relating to the second other vehicle from the second other vehicle, and acquires a second reception level from the second other vehicle, which is detected by the reception level detection unit, the arithmetic processing unit determines that a vehicle with a larger reception level is a vehicle closer to the own vehicle by comparing the first reception level and the second reception level when a difference between the first inter-vehicle distance and the second inter-vehicle distance is smaller than any of the first position error radius and the second position error radius, and determines that a vehicle with a smaller inter-vehicle distance is a vehicle closer to the own vehicle by comparing the first inter-vehicle distance and the second inter-vehicle distance when the difference between the first inter-vehicle distance and the second inter-vehicle distance is larger than both the first position error radius and the second position error radius, and the arithmetic processing unit calculates a distance to a leading vehicle being an inter-vehicle distance between the own vehicle and the vehicle closer to the own vehicle through use of any of the first inter-vehicle distance and the second inter-vehicle distance.

Advantageous Effects of Invention

According to the present invention, the inter-vehicle communication device that does not require map data and the driving assistance device using the inter-vehicle communication device can be achieved at a low cost. Problems, configurations, and effects other than those described above are defined clearly in the following description of the embodiments.

BRIEF DESCRIPTION OF DRAWINGS

FIG. 4 is a view illustrating an example of a data structure of an RSSI table in the first embodiment.

FIG. 5 is a view illustrating an example of data indicating references of positioning errors of a GPS reception unit in the first embodiment.

FIG. 15 is a view illustrating an example of data stored an RSSI table in the sixth embodiment.

DESCRIPTION OF EMBODIMENTS

First Embodiment

Now, with reference to the drawings, description is made on a first embodiment of the present invention. Note that, in all the drawings for illustrating the embodiments, the same members are basically denoted with the same reference symbols, and repeated description therefor is omitted in some cases. In the following embodiments, it is needless to say that the constituent elements (including element steps, and the like) are not necessarily essential unless otherwise particularly specified, obviously considered as essential in principle, or the like. It is needless to say that the expressions "being formed of A", "being constituted of A", "having A", and "including A" are not intended to eliminate other elements unless otherwise explicitly specifying to limit the particular element or the like. Similarly, in the following embodiments, when shapes of the constituent elements and the like, a positional relationship, and the like are referred to, shapes and the like that are substantially close to or similar to the shapes and the like are included unless otherwise particular specified, clearly considered to be exceptional in principle, or the like.

In general, reception strength of a radio wave can be indicated by an index called a receive signal strength indicator (RSSI). Basically, in a case of inter-vehicle communication through use of a wireless radio wave in a band of 5.9 gigahertz (GHz), a radio wave can be received with a stronger RSSI as another vehicle is at a closer distance. Meanwhile, during inter-vehicle communication, each vehicle transmits, to another vehicle(s), information on coordinates (latitude and longitude) of an own vehicle position, a traveling direction, speed, acceleration, and the like. However, the coordinates of the own vehicle position transmitted herein is based on global positioning system (GPS) information. Thus, there is variation in GPS accuracy, which may cause errors different from vehicle to vehicle.

As described above, in an inter-vehicle communication environment, when a leading and following relationship of a plurality of vehicles including other vehicles is determined, the accuracy thereof may remain low because position information received from the other vehicles may include errors that may cause the leading and following relationship to be misunderstood. In view of this, it is conceived that the accuracy can be improved by auxiliary utilizing distance information estimated from an RSSI.

Figure 1:
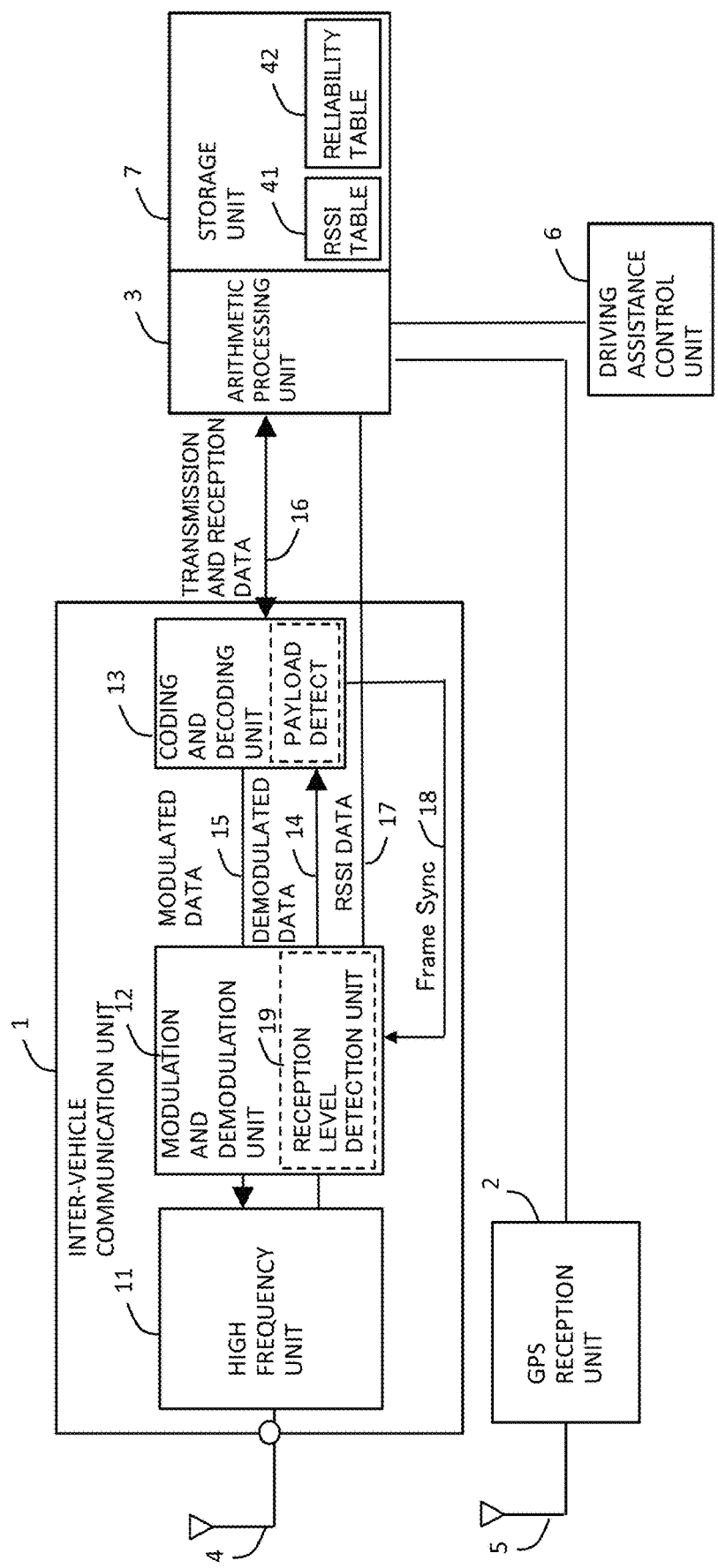
FIG. 1 is a view illustrating an inter-vehicle communication device according to a first embodiment of the present invention.

FIG. 1 is a view illustrating an inter-vehicle communication device according to the first embodiment of the present invention. An inter-vehicle communication device 100 includes an inter-vehicle communication unit 1, a GPS reception unit 2 (position information reception unit 2), an arithmetic processing unit 3, an inter-vehicle communication antenna 4, a GPS antenna 5, a driving assistance control unit 6, and a storage unit 7. The inter-vehicle communication unit 1 includes the high frequency unit 11, a modulation and demodulation unit 12, and a coding and decoding unit 13. In other words, the inter-vehicle communication device 100 that includes the driving assistance control unit 6 can be regarded not only as a simple inter-vehicle communication device but also as a driving assistance device.

The high frequency unit 11 transmits and receives a radio wave having a predetermined frequency (for example, a radio wave of 5.9 GHz) via the inter-vehicle communication antenna 4. Thus, in addition to inter-vehicle communication, communication with a roadside unit is can be performed. The modulation and demodulation unit 12 demodulates the radio wave received by the high frequency unit 11 to deliver the result of demodulation as demodulated data 14 to the coding and decoding unit 13, and calculates RSSI data to deliver the RSSI data to the arithmetic processing unit 3. Specifically, the modulation and demodulation unit 12 includes a reception level detection unit 19 that detects a reception level. The reception level detection unit 19 converts strength of the received radio wave to the RSSI data in accordance with a predetermined reference to deliver the RSSI data to the arithmetic processing unit 3. When the modulation and demodulation unit 12 receives modulated data 15 from the coding and decoding unit 13, the modulation and demodulation unit 12 modulates the data to a radio wave to deliver the radio wave to the high frequency unit 11.

When the coding and decoding unit 13 receives the transmitted data from the arithmetic processing unit 3, the coding and decoding unit 13 codes the data to deliver to the modulation and demodulation unit 12. When the coding and decoding unit 13 receives the demodulated data 14 from the modulation and demodulation unit 12, the coding and decoding unit 13 decodes the demodulated data to deliver the resultant to arithmetic processing unit 3. Note that, in the present embodiment, the data transmitted and received with the arithmetic processing unit 3 is collectively expressed as transmission and reception data 16. The coding and decoding unit 13 transmits, to the modulation and demodulation unit 12, a Frame Sync 18 being a signal for synchronization.

The arithmetic processing unit 3 performs various types of arithmetic processing. In the present embodiment, the arithmetic processing unit 3 is only required to be a programmable arithmetic device such as a central processing unit (CPU), a graphic processing unit (GPU), a micro processor, and a micro computer. In the arithmetic processing unit 3, various types of re-writable storage elements such as a random access memory (RAM), a cache, and a register are also provided in a usable manner, and an RSSI table 41 described later is stored in the storage unit 7 formed of such storage elements.

Figure 2:
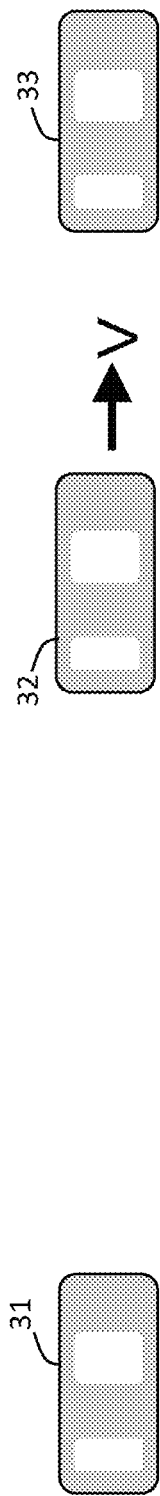
FIG. 2 is a view illustrating an example of a positional relationship between vehicles on which the inter-vehicle communication devices according to the first embodiment are mounted.

FIG. 2 is a view illustrating an example of a positional relationship of vehicles on which the inter-vehicle communication devices according to the first embodiment are mounted. Note that the positional relationship of the vehicles illustrated in FIG. 2 is not a positional relation of the vehicles on an actual road, but a positional relationship estimated based on the radio wave received by the inter-vehicle communication device 100. FIG. 2 illustrates an own vehicle 31 on which the inter-vehicle communication device 100 according to the present invention is mounted on, a leading vehicle 32 being a first vehicle that travels immediately in front of the own vehicle 31 in the same direction in coordination information, and a further leading vehicle 33 being another first vehicle that travels immediately in front of the leading vehicle 32 in the same direction in the coordination information.

Figure 3:
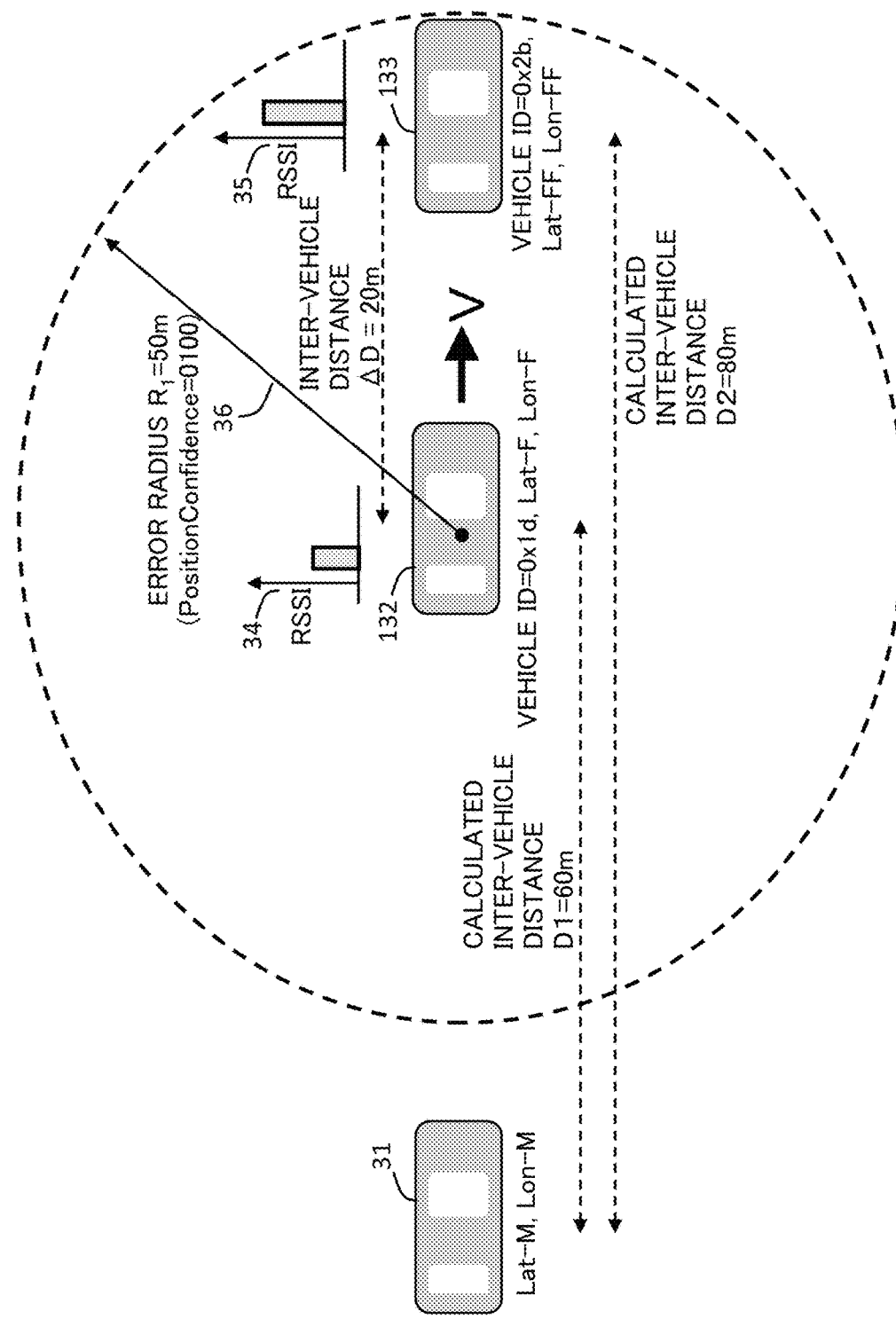
FIG. 3 is a view for illustrating arithmetic processing of an arithmetic processing unit in the first embodiment.

FIG. 3 is a view for illustrating the arithmetic processing of the arithmetic processing unit in the first embodiment. For describing the arithmetic processing for specifying the leading and following relationship of the vehicles described later, FIG. 3 illustrates data that the own vehicle 31 receives from the leading vehicle 32 and the further leading vehicle 33 in addition to the contents in FIG. 2. The leading vehicle 32 in FIG. 3 is assumed to have a vehicle ID of 0x1d and latitude and longitude of "Lat-F, Lon-F". Reception intensity of a radio wave emitted from the leading vehicle 32 at the own vehicle 31 is RSSI of 34, and an error radius $R_1$ 36 of the latitude and longitude of the GPS reception unit 2 is 50 m (Position Confidence=0100). Note that, in the following description, when referring to the vehicle with the vehicle ID of 0x1d itself, the vehicle is indicated as a (0x1d) vehicle 132.

Similarly, the further leading vehicle 33 is assumed to have a vehicle ID of 0x2b and latitude and longitude of "Lat-FF, Lon-FF". Reception intensity of a radio wave emitted from the further leading vehicle 33 at the own vehicle 31 is RSSI of 35, and an error radius (not illustrated) of latitude and longitude of the GPS reception unit is 50 m (Position Confidence=0100). Note that, in the following description, when referring to the vehicle with the vehicle ID of 0x2b itself, the vehicle is indicated as a (0x2b) vehicle 133.

FIG. 4 is a view illustrating an example of a data structure of an RSSI table in the first embodiment. The RSSI table 41 stores latitude and longitude 41b, reliability 41c, RSSI 41d, orientation 41e, and a speed 41f in association with a vehicle ID 41a. Here, the reliability 41c is a predetermined value indicating a positioning error (position confidence) of the GPS reception unit 2 illustrated in FIG. 5.

FIG. 5 is a view illustrating an example of data indicating references of positioning errors of the GPS reception unit 2 in the first embodiment. Here, reliability of the GPS is a value based on technical standards of inter-vehicle communication. For example, when the GPS reliability is "0100", it can be said that a positioning error radius of the GPS reception unit 2 is 50 m. As for another positioning error radius, positioning accuracy is associated in advance with each position confidence value.

Here, with reference to FIG. 1 to FIG. 4, description is made on the first embodiment. The inter-vehicle communication unit 1 of the own vehicle 31 receives data that is broadcast from nearby vehicles. In general, in an inter-vehicle communication system, transmitted data is anonymized to be irrelevant with individual information of a vehicle for the purpose of protecting privacy of a driver, and is broadcast with a vehicle ID that is temporarily generated.

The inter-vehicle communication device 100 of the own vehicle 31 receives data for the inter-vehicle communication from the (0x1d) vehicle 132 that is present nearby. For example, the inter-vehicle communication unit 1 receives, at intensity of RSSI 34 as illustrated in FIG. 3, inter-vehicle communication information indicating the latitude and longitude data of "Lat-F (Latitude-Forward), Lon-F (Longitude-Forward)", the GPS reliability (=Position Confidence) of "0100", the orientation of "East", and the vehicle speed of "50 km/H" as in FIG. 4, and delivers the data to the arithmetic processing unit 3. The arithmetic processing unit 3 stores the data in the RSSI table 41.

Subsequently, also from the (0x2b) vehicle 133 that is present nearby, the inter-vehicle communication unit 1 receives, at intensity of RSSI 35 as illustrated in FIG. 3, inter-vehicle communication information indicating the latitude and longitude data of "Lat-FF, Lon-FF", the GPS reliability of "0100", the orientation of "East", and the vehicle speed of "50 km/H", and stores the data in the RSSI table 41.

Figure 6:
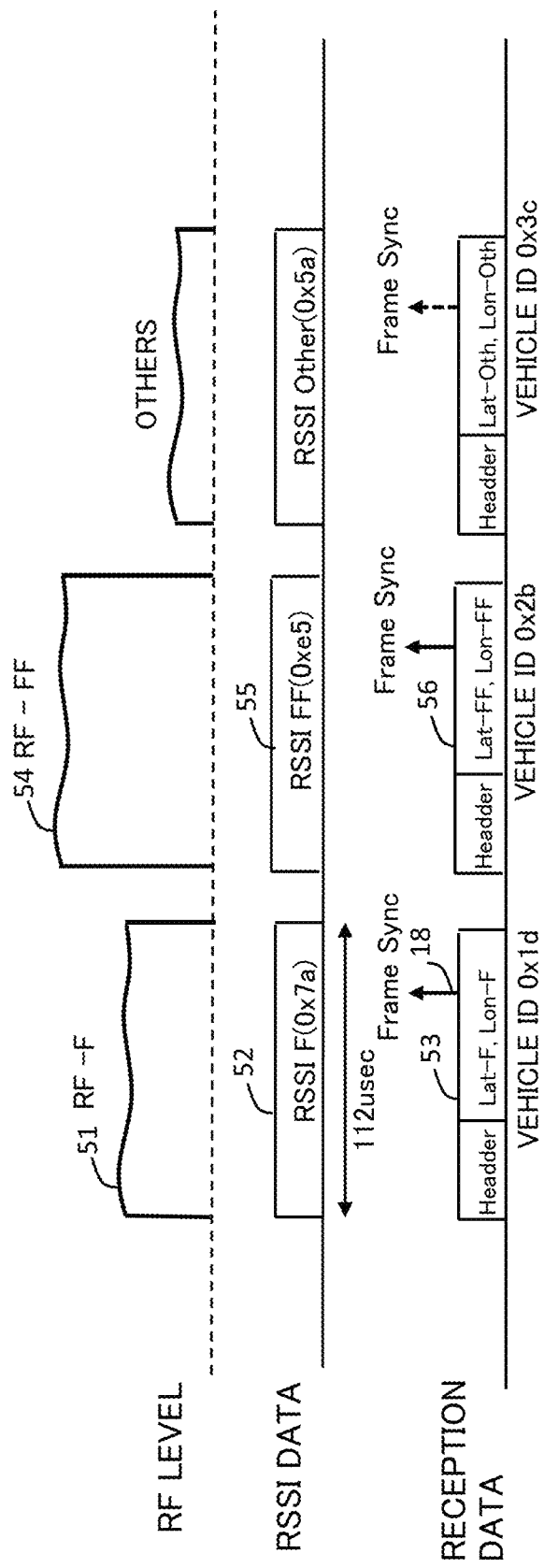
FIG. 6 is a view illustrating an example of a reception radio level of an own vehicle and timings for demodulated reception data in the first embodiment.

FIG. 6 is a view illustrating an example of a reception radio level of the own vehicle and timings for demodulated reception data in the first embodiment. Radio levels 51 and 54 indicate radio levels received from the (0x1d) vehicle 132 and the (0x2b) vehicle 133, respectively, and RSSI data 52 and 55 indicate RSSI data received from the (0x1d) vehicle 132 and the (0x2b) vehicle 133, respectively. Reception data 53 and 56 indicate demodulated and decoded reception data from the (0x1d) vehicle 132 and the (0x2b) vehicle 133, respectively.

Through use of this example, description is made on a process of generating the RSSI table 41. The coding and decoding unit 13 of the inter-vehicle communication device 100 outputs the Frame Sync 18 at a timing of receiving the data of the (0x1d) vehicle 132. When the Frame Sync 18 is input, the reception level detection unit 19 performs analog/digital (A/D) conversion on the reception signal at the timing of input, and outputs the resultant as the RSSI data 17 to the arithmetic processing unit 3. In this manner, the data in which the vehicle ID, the latitude and longitude, the reliability, and the RSSI are associated to each other is stored in the RSSI table 41. Note that, for simplification of description for this example, the information on the leading vehicle and the further leading vehicle is stored in the RSSI table 41. However, when vehicles capable of performing inter-vehicle communication with are present nearby, it is needless to say that information of the nearby vehicles is also stored in a similar manner.

The arithmetic processing unit 3 of the inter-vehicle communication device 100 reads the RSSI table 41, and calculates an inter-vehicle distance D1 between the own vehicle 31 and the (0x1d) vehicle 132 through use of a difference between "Lat-F, Lon-F" being latitude and longitude of the (0x1d) vehicle 132 and "Lat-M, Lon-M" being latitude and longitude of the own vehicle 31. In this case, for example, the calculation result is D1=60 m as illustrated in FIG. 3.

Subsequently, the arithmetic processing unit 3 calculates an inter-vehicle distance D2 between the own vehicle 31 and the (0x2b) vehicle 133 through use of a difference between "Lat-FF, Lon-FF" being latitude and longitude of the (0x2b) vehicle 133 and "Lat-M, Lon-M" being the latitude and longitude of the own vehicle 31. In this case, for example, the calculation result is D2=80 m as illustrated in FIG. 3.

Further, through use of Expression (2) given below, the arithmetic processing unit 3 compares a positioning error radius $R_1$ of the (0x1d) vehicle 132, which is 50 m, a positioning error radius $R_2$ of the (0x2b) vehicle 133, which is 50 m, and an inter-vehicle distance $\Delta D$ between the (0x1d) vehicle 132 and the (0x2b) vehicle 133 (calculated with Expression (1) given below).

$$\Delta D = D2 - D1 = 20 \text{ m} \quad \text{Expression (1)}$$

$$R_1, R_2 > \Delta D \quad \text{Expression (2)}$$

Figure 7:
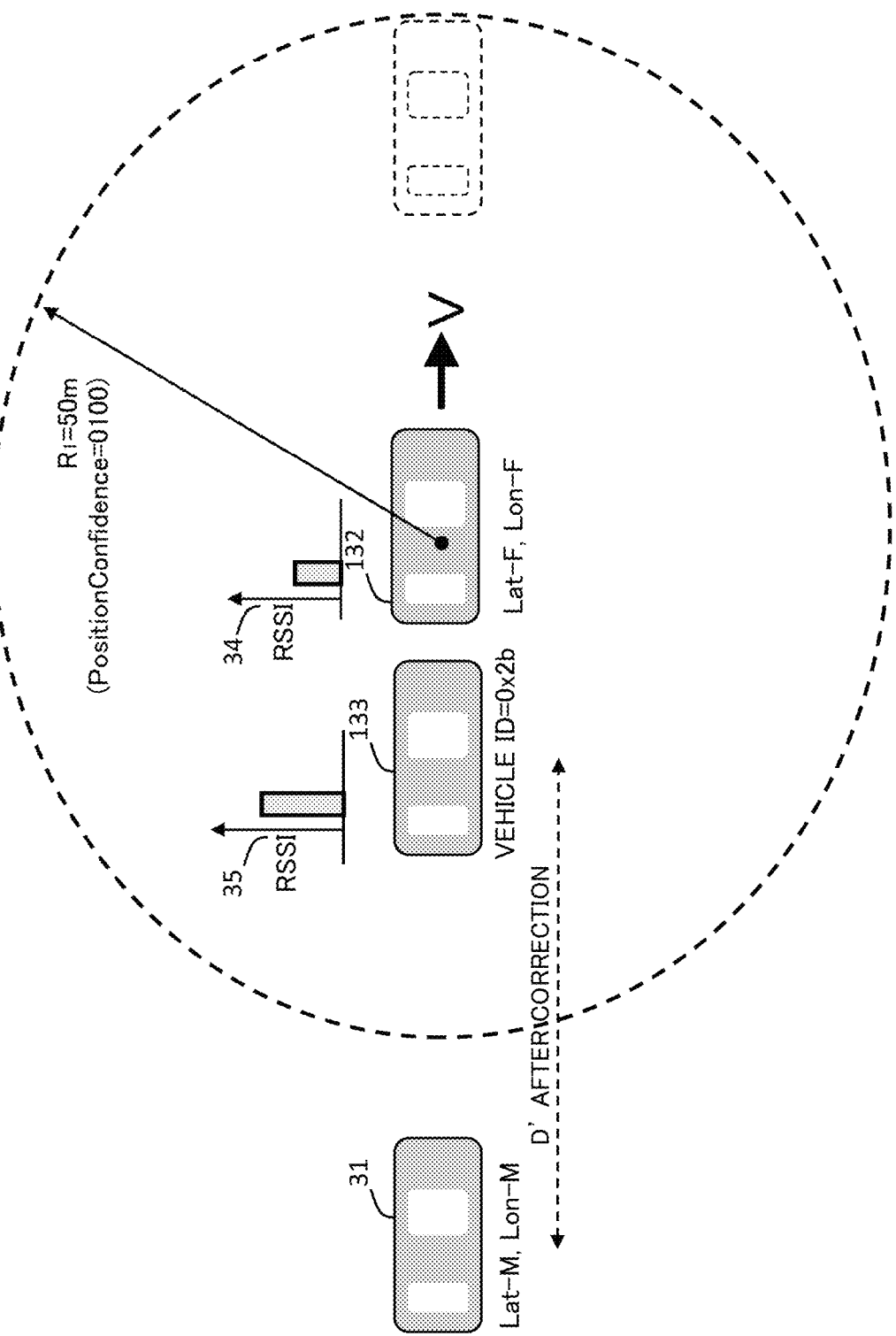
FIG. 7 is a view illustrating an example of a positional relationship of the vehicles at positions that are accurately corrected.

When Expression (2) given above is satisfied, the arithmetic processing unit 3 compares "0x7a (hexadecimal)" being the RSSI data on the (0x1d) vehicle 132 and "0xe5 (hexadecimal)" being the RSSI data on the (0x2b) vehicle 133, and specifies a vehicle having larger RSSI data. In this example, the inter-vehicle distance ΔD is smaller than the positioning error radiuses $R_1$ and $R_2$, and hence the leading and following relationship estimated based on the latitude and longitude that are broadcast from the two vehicles may be incorrect. Moreover, the (0x2b) vehicle 133, which is at a farther position based on the latitude and longitude that are broadcast from the two vehicles has larger RSSI. Thus, in this example, a probability that the (0x2b) vehicle 133 is closer to the own vehicle 31 than the (0x1d) vehicle 132 is higher, and the arithmetic processing unit 3 determines that the (0x2b) vehicle 133 is a leading vehicle being a first vehicle that travels immediately in front of the own vehicle 31. This state is illustrated in FIG. 7. Note that the positional relationship of the vehicles illustrated in FIG. 7 is not a positional relation of the vehicles on an actual road, but a positional relationship estimated based on the radio wave received by the inter-vehicle communication device 100.

FIG. 7 is a view illustrating an example of the vehicles at positions that are accurately corrected. The (0x2b) vehicle 133 at a position accurately corrected by the arithmetic processing unit 3 is illustrated at the position from the own vehicle 31 by an immediate distance D'. Note that the distance D' is calculated by the arithmetic processing unit 3 by a calculating method described later.

With this processing, even when the GPS error is large, a vehicle speed, acceleration, a vehicle size, and the like can be utilized for safety driving assistance while grasping a leading vehicle accurately.

Subsequently, description is made on the operations described above with reference to a flowchart in FIG. 8.

Figure 8:
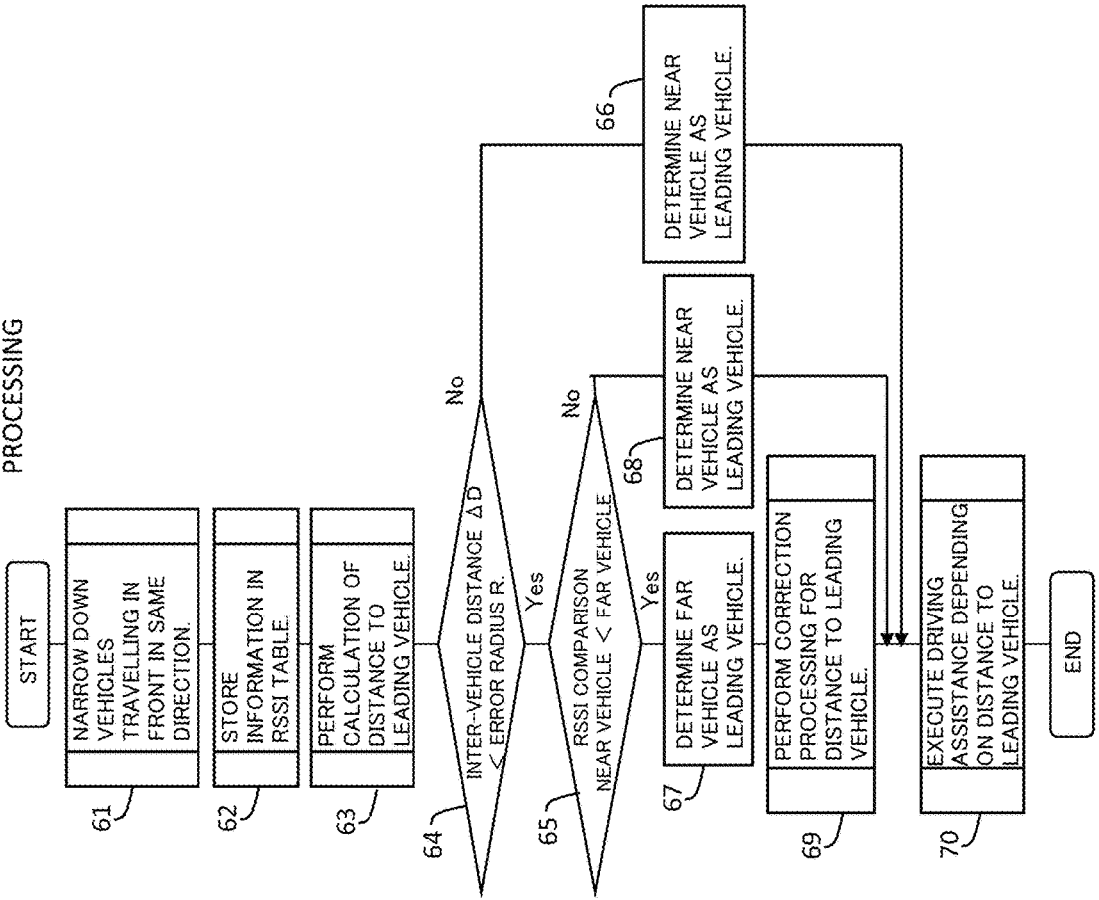
FIG. 8 is a view illustrating a flowchart example of leading vehicle determination processing.

FIG. 8 is a view illustrating a flowchart example of leading vehicle determination processing. First, the arithmetic processing unit 3 of the own vehicle 31 narrows down vehicles traveling in front in the same direction (Step 61). Specifically, among the data received from the nearby vehicles, the arithmetic processing unit 3 selects data on vehicles that travel to the same orientation as the own vehicle and travel in front of the vehicle, based on calculation from the received latitude and longitude. The orientation data contained in broadcast messages from the nearby vehicles through the inter-vehicle communication is in a unit of 0.0125 degrees. Thus, in the processing, the arithmetic processing unit 3 performs the processing while regarding vehicle data with orientation, the difference from the orientation of the own vehicle being within ±5.0 degrees, as vehicle data for the same orientation as the own vehicle.

Subsequently, the arithmetic processing unit 3 stores the information in the RSSI table 41 (Step 62). Specifically, in the RSSI table 41, the arithmetic processing unit 3 stores the received data selected in Step 61.

Subsequently, the arithmetic processing unit 3 performs calculation of a distance to a leading vehicle (Step 63). Specifically, the arithmetic processing unit 3 calculates the distance D1 between the own vehicle and the (0x1d) vehicle 132 and the distance D2 between the own vehicle and the (0x2b) vehicle 133. Further, the arithmetic processing unit 3 calculates the difference distance ΔD between the distance D1 and the distance D2. Description is made on processing for calculating the distances D1, D2, and ΔD with reference to FIG. 9

Figure 9:
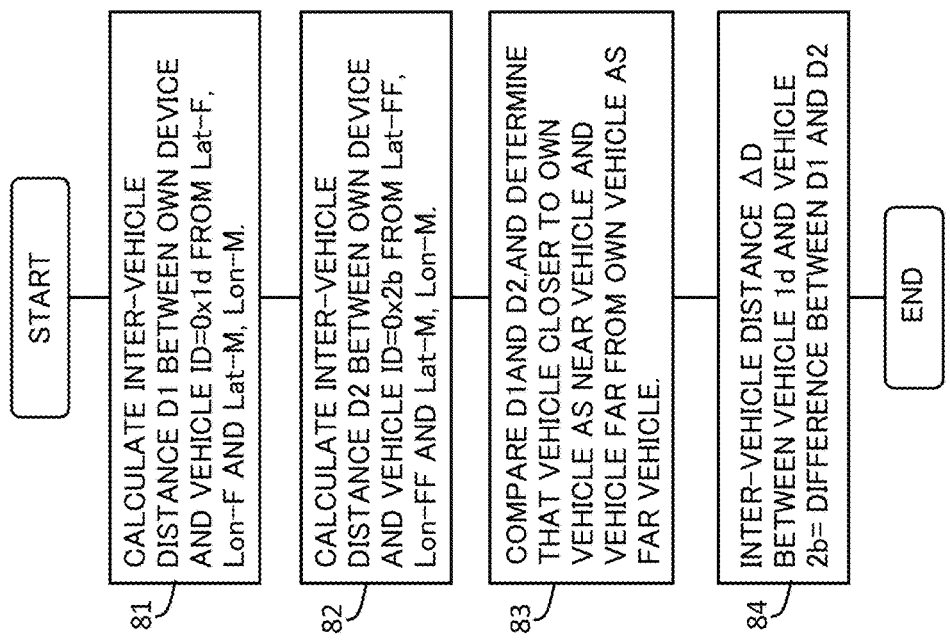
FIG. 9 is a view illustrating a flowchart example of calculation processing for a distance to another leading vehicle.

FIG. 9 is a view illustrating a flowchart example of calculation processing for a distance to another leading vehicle. First, the arithmetic processing unit 3 calculates the inter-vehicle distance D1 between the own vehicle 31 and the (0x1d) vehicle 132 through use of "Lat-F, Lon-F" being the information on the latitude and longitude of the (0x1d) vehicle 132 and "Lat-M, Lon-M" being the information on the latitude and longitude of the own vehicle 31 (Step 81).

Subsequently, the arithmetic processing unit 3 calculates the inter-vehicle distance D2 between the own vehicle 31 and the (0x2b) vehicle 133 through use of "Lat-FF, Lon-FF" being the information on the latitude and longitude of the (0x2b) vehicle 133 and "Lat-M, Lon-M" being the latitude and longitude of the own vehicle 31 (Step 82).

Further, the arithmetic processing unit 3 compares the distances D1 and D2, and determines a vehicle near the own vehicle 31 as a Near vehicle and a vehicle far from the own vehicle 31 as a Far vehicle (Step 83). Specifically, arithmetic processing unit 3 compares the distance D1 between the own vehicle 31 and the (0x1d) vehicle 132 and the distance D2 between the own vehicle 31 and the (0x2b) vehicle 133, and determines a vehicle with a smaller value (in this example, the (0x1d) vehicle 132) as a Near vehicle and a vehicle with a larger value (in this example, the (0x2b) vehicle 133) as a Far vehicle.

Further, the arithmetic processing unit 3 calculates ΔD being the inter-vehicle distance between the (0x1d) vehicle 132 and the (0x2b) vehicle 133 as a difference between D1 and D2 with Expression (3) given below (Step 84).

$$\text{Inter-vehicle distance } \Delta D = |D1 - D2| \quad \text{Expression (3)}$$

The above is flow of the calculation processing for a distance to another leading vehicle. With the calculation processing for a distance to another leading vehicle, the inter-vehicle distance between the leading vehicle and the further leading vehicle can be calculated.

Referring back to FIG. 8, the arithmetic processing unit 3 compares the inter-vehicle distance ΔD being a calculation result and an error radius R received from each vehicle through the inter-vehicle communication (Step 64). Note that the error radius R include an error radius $R_1$ of the (0x1d) vehicle 132 and an error radius $R_2$ of the (0x2b) vehicle 133, and hence the arithmetic processing unit 3 compares ΔD and each of $R_1$ and $R_2$.

When the inter-vehicle distance ΔD is smaller than any of the positioning error radiuses $R_1$ and $R_2$ ("Yes" in Step 64), the arithmetic processing unit 3 compares the RSSI of the Near vehicle (the (0x1d) vehicle 132) and the RSSI of the Far vehicle (the (0x2b) vehicle 133) (Step 65).

When the inter-vehicle distance ΔD is equal to or larger than any of the positioning error radiuses $R_1$ and $R_2$ ("No" in Step 64), the arithmetic processing unit 3 determines that the Near vehicle is the leading vehicle closer to the own vehicle 31 (Step 66).

When the RSSI of the Far vehicle is larger than the RSSI of the Near vehicle ("Yes" in Step 65), the arithmetic processing unit 3 determines that the Far vehicle is closer to the own vehicle 31, in other words, the Far vehicle is the leading vehicle (Step 67).

When the RSSI of the Near vehicle is larger than that of the Far vehicle ("No" in Step 65), the arithmetic processing unit 3 determines that the Near vehicle is closer to the own vehicle 31, in other words, the Near vehicle is the leading vehicle (Step 68).

When it is determined that the Far vehicle is closer to the own vehicle 31 ("Yes" in Step 67), the arithmetic processing unit 3 performs inter-vehicle distance correction processing about the inter-vehicle distance to the leading vehicle (Step 69).

This processing is expressed as:

$$D' = D2 - R \times k \quad \text{Expression (4),}$$

where the positioning error radius is R, an inter-vehicle distance to the leading vehicle after correction is D', and a distance between the Far vehicle and the own vehicle 31 is D2. Here, "k" is a correction coefficient relating to a GPS error, and satisfies 0.5<k<1.0. For example, as in FIG. 3, when the distance D2 between the own vehicle and the further leading vehicle, which is initially calculated, is 80 m (D2=80), and k=0.8, D' is calculated as D"=80−50×0.8=40 m, and the accurate position, which is closer to the own vehicle than the distance D1 to the (0x1d) vehicle 132 being 60 m, can be obtained.

Note that the inter-vehicle distance correction processing is not limited to Expression (4) given above. An example of another inter-vehicle distance correction processing method is given. When the distances from the own vehicle 31 to the (0x1d) vehicle 132 and the (0x2b) vehicle 133 are denoted with D1 and D2, respectively, and the difference of RSSIs is denoted with ΔRs [dB], Expression (5) given below is satisfied based on Friis radio wave transmission loss formula.

$$\Delta Rs = 20 \log(\lambda/D1) - 20 \log(\lambda/D2) \qquad \text{Expression (5)}$$

Therefore, 20 log(D1/D2)=ΔRs, and a ratio of the distances D1 and D2 is obtained with Expression (6) given below.

$$D1/D2 = 10^{(\Delta Rs/20)} \qquad \text{Expression (6)}$$

When the (0x1d) vehicle 132 and the (0x2b) vehicle 133 are compared, the (0x2b) vehicle 133 is actually closer to the own vehicle 31 by an amount of ΔRs. Therefore, the distance D' obtained by correcting D2 through use of Expression (6) given above is expressed with Expression (7) given below.

$$\text{Correction distance } D' = D2 \times (10^{(\Delta Rs/20)}) \qquad \text{Expression (7)}$$

For example, when ΔRs=−6.0 dB, and the distance D2 from the own vehicle 31 to the (0x2b) vehicle 133 is $0 m (D2=80 m), the correction distance D' is D'=80×(10$^{(-6/20)}$) =100×0.501=50 m.

Further, depending on the corrected inter-vehicle distance D', the driving assistance control unit 6 performs safety driving assistance processing such as calling for attention of a driver to an approach of the leading vehicle with a voice sound (Step 70).

Note that, it is not limited to such calling for attention, the driving assistance control unit 6 may call for attention of a driver to an approach of the leading vehicle with, for example, visual display such as a display, or alternatively, may control a braking device of the own vehicle 31 for deceleration. Moreover, through use of the inter-vehicle distance between the own vehicle 31 and the further leading vehicle 33, which is calculated by adding the inter-vehicle distance between the leading vehicle 32 and the further leading vehicle 33 to the corrected inter-vehicle distance D', the driving assistance control unit 6 may call for attention of a driver to an approach of the further leading vehicle 33 with a voice sound or visual display such as a display or alternatively, may control a braking device of the own vehicle 31 for deceleration. In this manner, driving assistance can be performed through use of the inter-vehicle distance to the further leading vehicle 33, and hence a prevention operation can be performed at a safer timing.

The above is the inter-vehicle communication device 100 according to the first embodiment. Through use of the inter-vehicle communication device according to the present embodiment, the leading and following relationship of the vehicles that travel in front in the same direction can be specified at high accuracy, and the inter-vehicle communication device that does not require map data and the driving assistance device using the inter-vehicle communication device can be achieved at a low cost.

Second Embodiment

Basically, a second embodiment is substantially the same as the first embodiment except for a few points, and description is made below on their differences.

Figure 10:
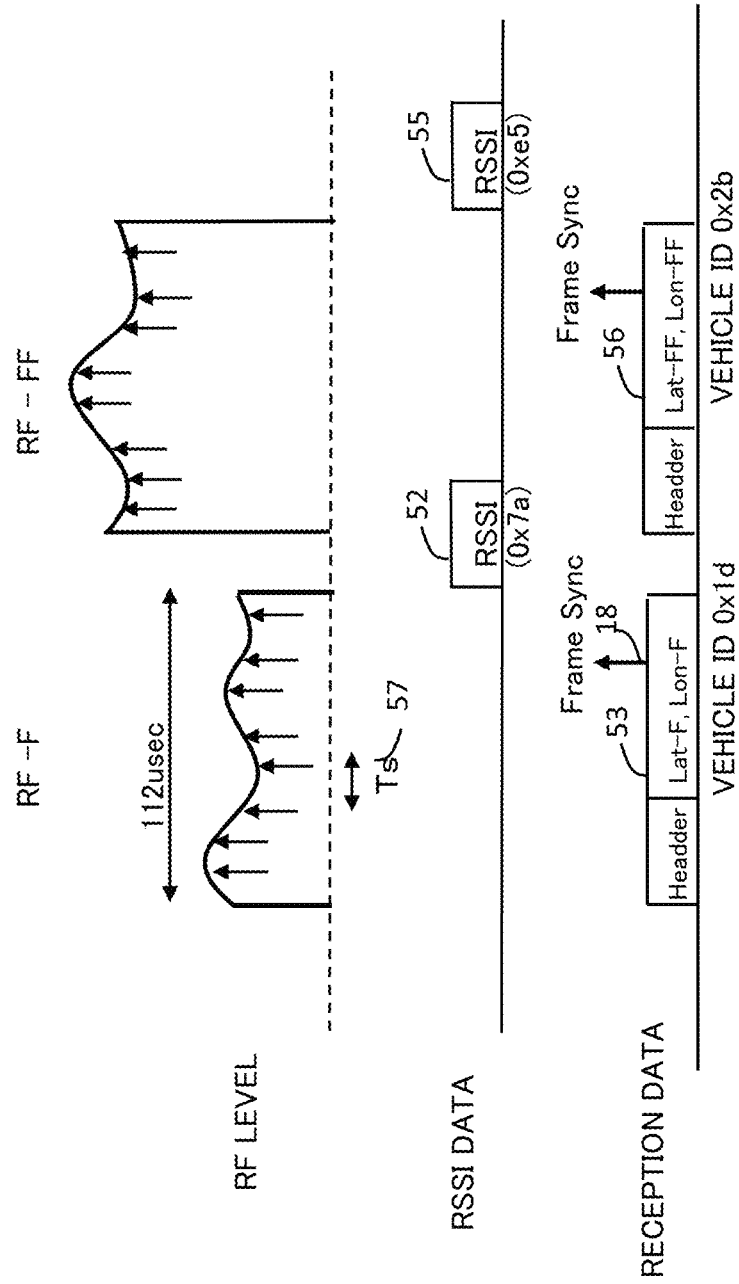
FIG. 10 is a view illustrating an example of a reception radio level and timings for RSSI data in the second embodiment.

FIG. 10 illustrates a reception radio level of the own vehicle 31 and timings for acquiring the RSSI data in an inter-vehicle communication device according to the second embodiment of the present invention.

FIG. 10 is a view illustrating an example of a reception radio level and timings for acquiring RSSI data in the second embodiment. The own vehicle 31 receives radio waves from other vehicles while traveling, and the reception intensity has ripple fluctuation even in the same reception slot. An influence of the ripple fluctuation is eliminated to accurately measure the reception levels from the other vehicles. A reception level detection unit 19 of a modulation and demodulation unit 12 in the second embodiment performs sampling a plurality of times with a sampling period Ts 57 in one reception slot, and an average value thereof is set as the RSSI data 17.

In FIG. 10, there is illustrated an example in which sampling is performed eight times with Ts of 13 μsec in a reception slot of 112 μsec to obtain an average value. With the inter-vehicle communication device according to the second embodiment as described above, even when ripple fluctuation occurs in the reception levels of the radio waves received from the other vehicles, the inter-vehicle distance to the leading vehicle can be measured.

Third Embodiment

Basically, a third embodiment is substantially the same as the first embodiment except for a few points, and description is made below on their differences.

Figure 11:
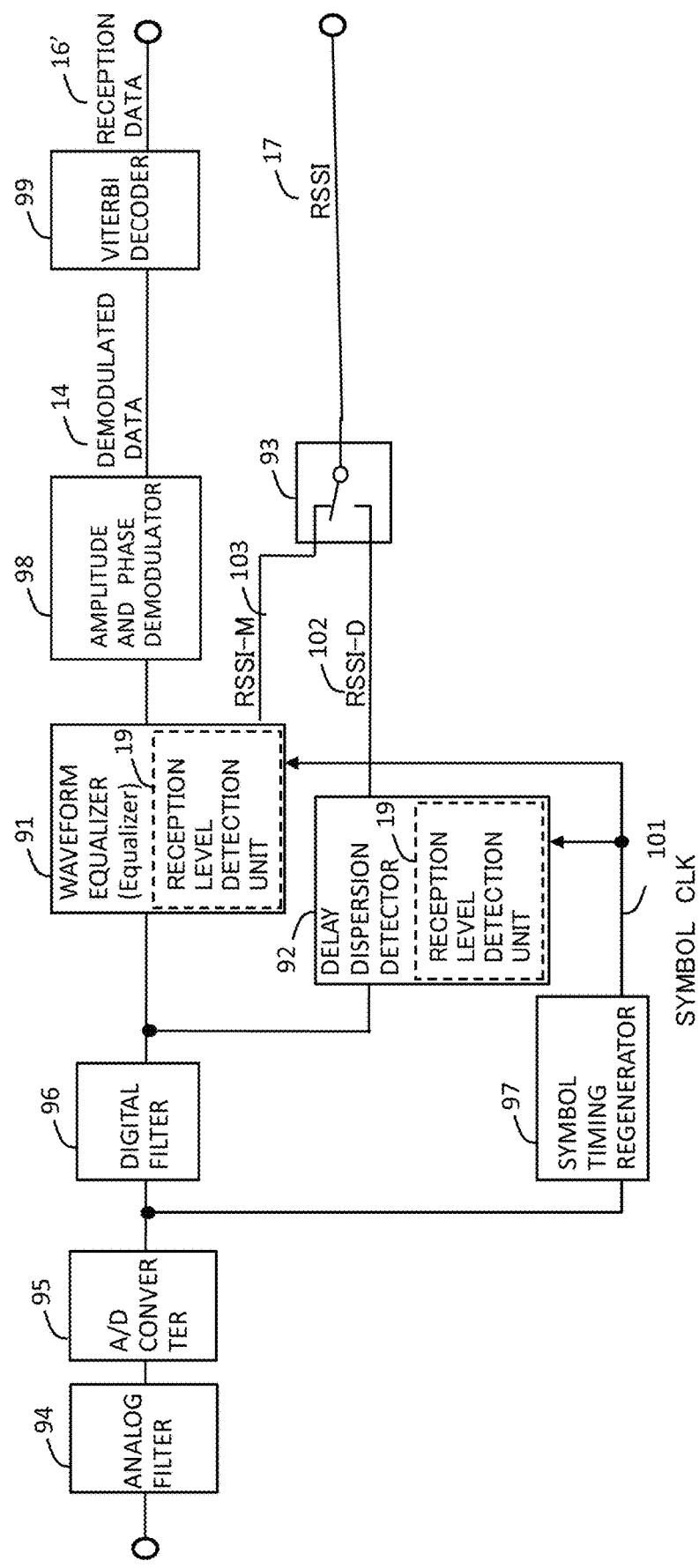
FIG. 11 is a view illustrating a configuration example of a base band reception unit in a third embodiment.

FIG. 11 illustrates a base band reception unit (a circuit including a reception system of the modulation and demodulation unit 12 and a reception system of the coding and decoding unit 13 in FIG. 1) of an inter-vehicle communication device according to the third embodiment of the present invention.

FIG. 11 is a view illustrating a configuration example of the base band reception unit in the third embodiment. The base band reception unit includes a waveform equalizer 91, a delay dispersion detector 92, a switch 93, an analog filter 94, an A/D converter 95, a digital filter 96, a symbol timing regenerator 97, an amplitude and phase demodulator 98, and a viterbi decoder 99.

When a modulation multiplexing system used for the inter-vehicle communication is amplitude phase modulation, on the reception circuit, after A/D conversion is performed, waveform equalization processing, amplitude and phase demodulation, and viterbi decoding are performed, and converted reception data 16' is obtained. A symbol timing is reproduced from a signal modulated at a symbol speed in this demodulation, and is input as a symbol CLK 101 to the waveform equalizer 91.

Here, during mobile reception as in a case of an automobile, a signal subjected to multipath fading is received. Thus, in the base band reception unit in the third embodiment, the waveform equalizer 91 corrects an amplitude and a phase to reduce a fading influence.

The delay dispersion detector 92 detects delay dispersion received by the reception signal from fading, and separates a component with the smallest delay dispersion, in other words, a direct wave component from a transmission antenna of the inter-vehicle communication device of the other vehicle to a reception antenna of the own vehicle. Further, the reception level detection unit 19 of the delay dispersion detector 92 outputs, to the switch 93, a signal level of the direct wave component as RSSI-D 102.

In parallel to this process, the delay dispersion detector 92 detects intensity of delay dispersion. When it is determined that the direct wave component is weaker than a total of other delay components, the delay dispersion detector 92 controls the switch 93 to set the RSSI-D 102 to RSSI 17, and outputs the resultant to the arithmetic processing unit 3. With the inter-vehicle communication device according to the third embodiment as described above, even in a reception environment in which multipath fading occurs, intensity of a signal directly received from the other vehicle can be measured, and hence highly accurate inter-vehicle distance measurement can be performed.

Fourth Embodiment

Basically, a fourth embodiment is substantially the same as the first embodiment except for a few points, and description is made below on their differences.

Figure 12:
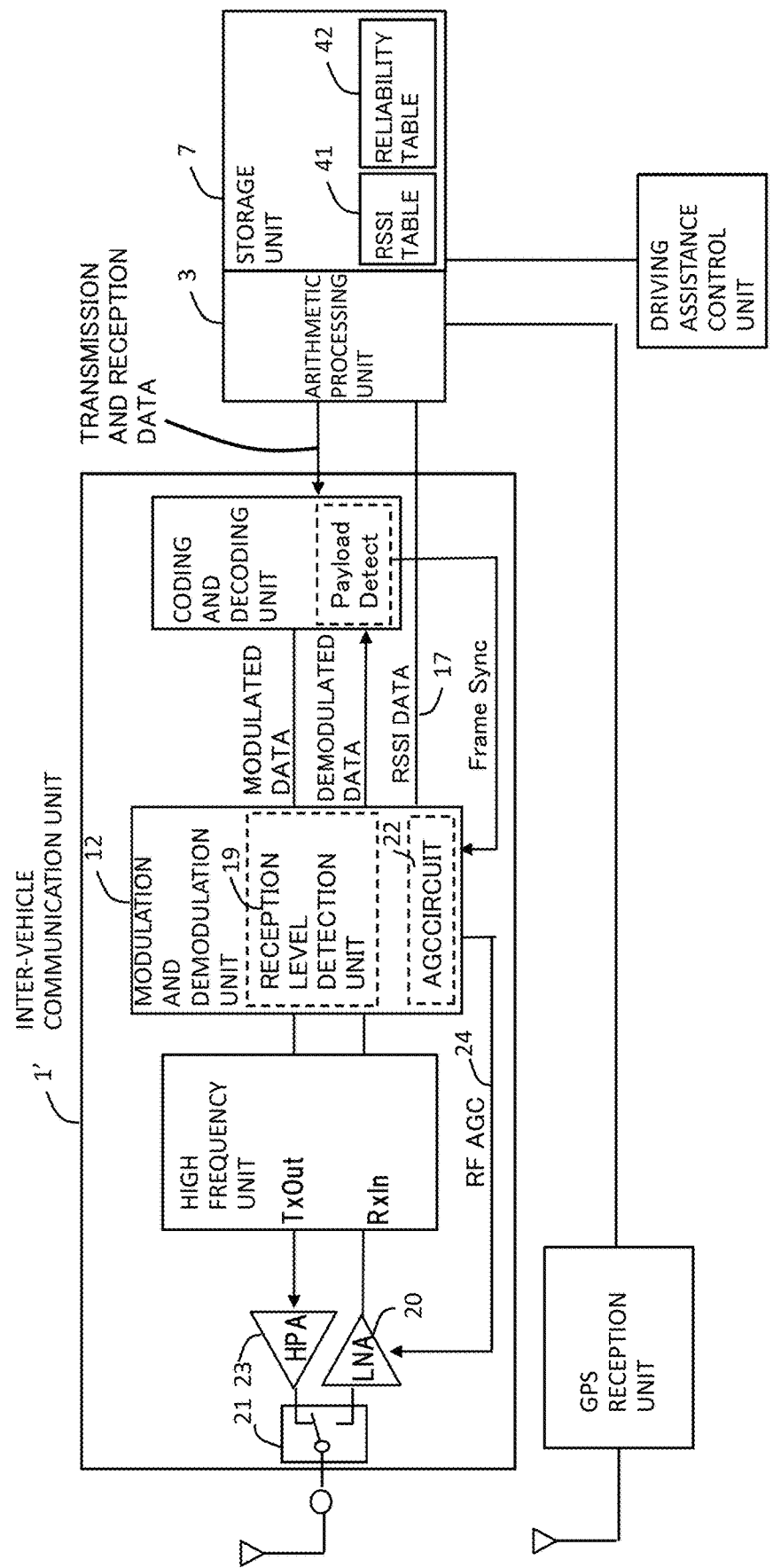
FIG. 12 is a view illustrating a configuration example of an inter-vehicle communication unit in a fourth embodiment.

FIG. 12 illustrates an inter-vehicle communication device being an inter-vehicle communication device according to the fourth embodiment of the present invention.

FIG. 12 is a view illustrating a configuration example of an inter-vehicle communication unit in the fourth embodiment. Between the high frequency unit 11 and the inter-vehicle communication antenna 4, an inter-vehicle communication unit 1' includes a low noise amplifier (LNA) 20, a high power amplifier (HPA) 23, and an antenna switch 21. The modulation and demodulation unit 12 includes an automatic gain control (AGC) circuit 22, and an RFAGC24 signal is output from the AGC circuit 22.

A wireless transmission/reception circuit includes a circuit that performs gain adjustment for a first stage reception amplifier to maintain an input level of a demodulation unit within a certain range, and this adjustment signal is referred to as a high frequency automatic gain control (RFAGC) signal. As already described above, in mobile reception as in a case of an automobile, the reception signal level input from the antenna fluctuates. When the reception level is low, the AGC circuit 22 increases gains of the LNA 20 with the high intensity of RFAGC24 signal. When the reception level is high, the AGC circuit 22 lowers gains of the LNA 20 with the low intensity of RFAGC24 signal. In other words, it can be said that amplitude fluctuation of the reception level is equivalent to an inversion signal of the RFAGC24 signal.

The reception level detection unit 19 of the modulation and demodulation unit 12 in the present embodiment adds an inversion signal component of the RFAGC24 signal to the reception level applied with A/D conversion, and outputs the resultant as the RSSI data 17 to the arithmetic processing unit 3. With the inter-vehicle communication device according to the fourth embodiment as described above, the AGC circuit 22 can also measure reception level fluctuation corrected at a high speed, and can appropriately grasp reception intensity while eliminating a correction influence. Thus, highly accurate inter-vehicle distance measurement can be performed.

Fifth Embodiment

Basically, a fifth embodiment is substantially the same as the first embodiment except for a few points, and description is made below on their differences.

In some cases, the positioning error radius being the GPS reliability in the first embodiment is not an error radius, but may be indicated with a long radius and a short radius of an error ellipsoid. In this case, the arithmetic processing unit 3 sets a long radius as an error radius.

Alternatively, in a similar manner, when the positioning error radius being the GPS reliability in the first embodiment is not indicated with an error radius but with position dilution of precision (PDOP), the arithmetic processing unit 3 converts PDOP to an error radius by general algorithm.

With the inter-vehicle communication device according to the fifth embodiment as described above, inter-vehicle communication corresponding to various systems and types of vehicles can be performed, and the leading and following relationship of the vehicles can be specified at high accuracy.

Sixth Embodiment

Basically, a sixth embodiment is substantially the same as the first embodiment except for a few points, and description is made below on their differences.

Figure 13:
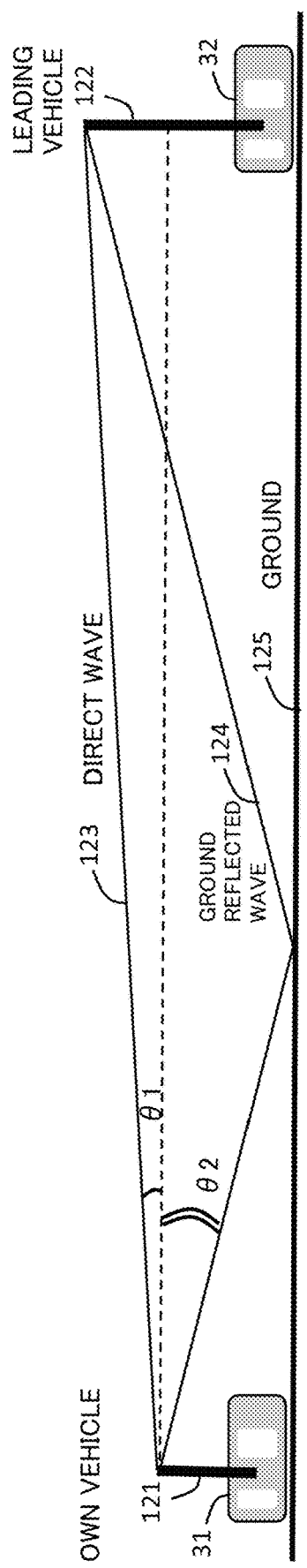
FIG. 13 is a schematic view illustrating an example of receiving a radio wave from a leading vehicle, which is reflected on a ground, in a sixth embodiment.
Figure 14:
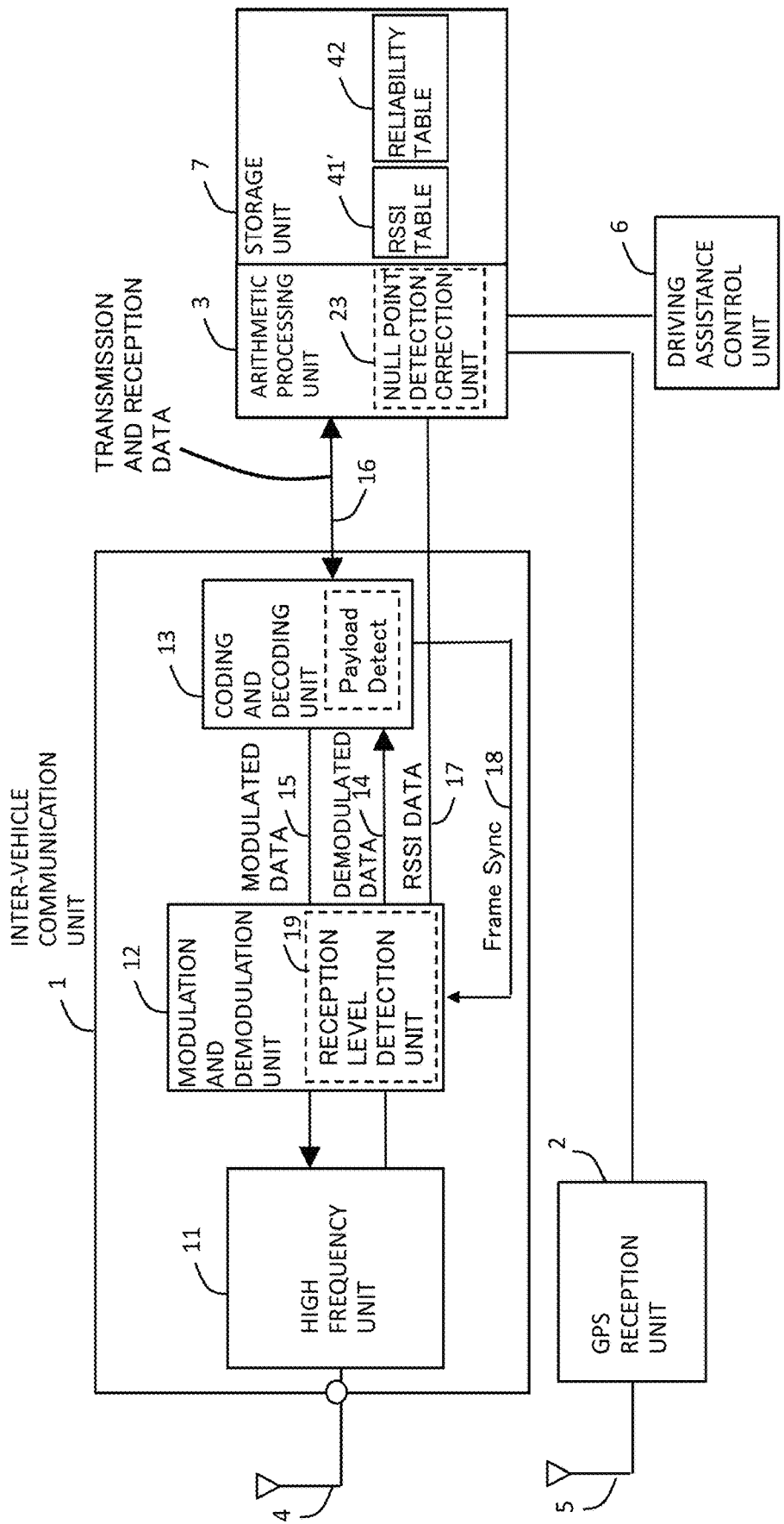
FIG. 14 is a view illustrating a configuration example of an inter-vehicle communication device according to the sixth embodiment.

With reference to FIG. 13, FIG. 14, and FIG. 15, description is made on an inter-vehicle communication device according to the sixth embodiment of the present invention. FIG. 13 is a schematic view illustrating an example of receiving a radio wave from a leading vehicle, which is reflected on a ground. The own vehicle 31 is provided with a reception antenna 121, and the leading vehicle 32 is provided with a transmission antenna 122. A radio wave emitted from the transmission antenna 122 arrives at the reception antenna 121 not only as a direct wave 123 directly transmitted and received between the antennas but also as a ground reflected wave 124 reflected from a ground 125.

The reception signal level of the reception antenna 121 in this case is a signal level obtained by synthesizing the direct wave 123 and the ground reflected wave 124, and is determined by a wavelength of the radio wave and a distance between transmission and reception. When a phase of the direct wave 123 and a phase of the ground reflected wave 124 are inverted from each other, the reception level is lowered, which is known as a so-called reception null point.

When calculation is performed with a wavelength of 5.9 gigahertz (GHz) used for the inter-vehicle communication, the null point appears at two points, which are around 50 m (a range from 45 m to 55 m in consideration of an error) and around 105 m (a range from 100 m to 110 m in consideration of an error) within a range in which the inter-vehicle distance to the leading vehicle 32 is from 40 m to 150 m. Thus, the RSSI received at those inter-vehicle distances has a significantly small value. Thus, the RSSI of the radio wave received at those inter-vehicle distances does not indicate an actual inter-vehicle distance.

FIG. 14 is a view illustrating a configuration example of the inter-vehicle communication device according to the sixth embodiment. An arithmetic processing unit 3 in the sixth embodiment includes a null-point detection and correction unit 23.

FIG. 15 is a view illustrating an example of data stored in an RSSI table in the sixth embodiment. An RSSI [dBm] 45a is an RSSI level (for example, indication with dBm) obtained by converting the received RSSI data to an antenna signal level by the arithmetic processing unit 3, and a message counter 45*b* is a message counter that counts received messages in a chronological order. An inter-vehicle distance [m] 45*c* to the own vehicle, which is obtained from latitude and longitude is information indicating the distance to the own vehicle, which is calculated through use of the received latitude and longitude.

The arithmetic processing unit 3 calculates an inter-vehicle distance to the own vehicle, based on the latitude and longitude received from the vehicle traveling in front, and stores the inter-vehicle distance, and regarding the data of the same vehicle ID, message counters are incremented in the order of reception and stored as a message counter 45*b*.

When an inter-vehicle distance 45*c* with the latest message counter 45*b* in the RSSI table 41' is included in the null points that are known in advance (for example, the range from 45 m to 55 m and the range from 100 m to 110 m), the null-point detection and correction unit 23 compares the latest (message counter="3" in the example of FIG. 15) RSSI 45*a* with the preceding two.

In the example of FIG. 15, the preceding two pieces of data (RSSI and inter-vehicle distance) is (−46,80) and (−50, 130), and the latest inter-vehicle distance is 105 m. In this case, the RSSI is required to fall within a range from −46 dBm to −50 dBm in theory, whereas the latest RSSI is "−61 dBm". Thus, the null-point detection and correction unit 23 determines that the received level is lowered due to the ground reflected wave 124 (for example, a threshold value is 10 dB or more), and corrects the RSSI 45*a* of the message counter of "3" for the vehicle ID "0x1d".

As one example of such correction method of an RSSI, it is conceivable that the null-point detection and correction unit 23 performs correction to satisfy "RSSI=−46−2.4=− 48.4 dBm" corresponding to a midpoint of the distance with message counters of "1" and "2". However, the present embodiment is not limited thereto. It is also conceivable that the null-point detection and correction unit 23 calculates an asymptote of the message counters of "1" and "2" and performs correction to a value corresponding to the latest RSSI on the asymptote. As described above, with the inter-vehicle communication device according to the sixth embodiment, even when an influence of a reflected wave from the ground is significant, the inter-vehicle distance to the leading vehicle can be measured at high accuracy.

The above is the inter-vehicle communication device and the driving assistance device according to the first embodiment to the sixth embodiment. Note that the present invention is not limited to the above-mentioned embodiments, and includes various modification examples. For example, in the embodiments described above, a leading and following relationship of two vehicles, which travel in substantially the same direction, at near positions calculated based on position information is specified. However, the present invention is not limited thereto, and vehicles traveling in opposite directions may be included. With this, a distance between vehicles performing crossing travel can be specified, and hence driving assistance can be performed by, for example, displaying a warning to a driver. Alternatively, traffic lanes may be specified by white line recognition processing and the like so that a vehicle traveling on a different traffic lane is eliminated even though the vehicle is traveling in the same direction. Further, a leading and following relationship of proximate two vehicles may be specified for each traffic lane. With this, miss recognition such as prediction of collision with a vehicle, which is not likely to collide with because of traveling on a different traffic lane, is reduced, and driving assistance can be performed at high accuracy.

The embodiments described above are described in detail for the sake of better understanding of the present invention, and the present invention is not necessarily limited to including all the configurations described herein. It is possible to replace a part of a configuration of one embodiment with a configuration of another embodiment. It is also possible to add a configuration of one embodiment to a configuration of another embodiment. It is possible to eliminate a part of a configuration of each embodiment.

A part or an entirety of each configuration, function, processing unit, and the like described above may be implemented with hardware by, for example, designing of an integrated circuit. Each configuration, function, and the like described above may be implemented with software by a processor that reads and executes a program achieving each function. Information on a program, a table, a file, and the like that achieve each function may be stored in a recording device such as a memory and a hard disk or a recording medium such as an IC card, an SD card, and a DVD.

Note that illustrations of control lines and information lines in the embodiments described above are those considered to be necessary for the sake of description, and not necessarily include all the control lines and information lines necessary as a product. In actuality, it may be considered that substantially all the configurations are connected to one another. The present invention is as described above mainly with the embodiments.

REFERENCE SIGNS LIST

1 Inter-vehicle communication unit
2 GPS reception unit
3 Arithmetic processing unit
4 Inter-vehicle communication antenna
5 GPS antenna
6 Driving assistance control unit
11 High frequency unit
12 Modulation and demodulation unit
13 Coding and decoding unit
14 Demodulated data
15 Modulated data
16 Transmission and reception data
17 RSSI data
18 Frame synchronous signal
19 Reception level detection unit
100 Inter-vehicle communication device

What is claimed is:

1. An inter-vehicle communication device for being mounted on a vehicle and wirelessly communicating with other vehicles, the inter-vehicle communication device comprising:
    an inter-vehicle communication unit including a reception level detection unit;
    a position information reception unit; and
    an arithmetic processing unit, wherein
    the arithmetic processing unit calculates a first inter-vehicle distance to a first other vehicle through use of latitude and longitude information on the first other vehicle, which is received by the inter-vehicle communication unit, and latitude and longitude information on an own vehicle of the position information reception unit, receives a first position error radius relating to the first other vehicle from the first other vehicle, and acquires a first reception level from the first other vehicle, which is detected by the reception level detection unit, the arithmetic processing unit calculates a second inter-vehicle distance to a second other vehicle through use of latitude and longitude information on the second other vehicle, which is received by the inter-vehicle communication unit, and the latitude and longitude information on the own vehicle of the position information reception unit, receives a second position error radius relating to the second other vehicle from the second other vehicle, and acquires a second reception level from the second other vehicle, which is detected by the reception level detection unit, the arithmetic processing unit
determines that the first other vehicle is a vehicle with a larger reception level and is a vehicle closer to the own vehicle by comparing the first reception level and the second reception level when a difference between the first inter-vehicle distance and the second inter-vehicle distance is smaller than any of the first position error radius and the second position error radius, and determines that the second other vehicle is a vehicle with a smaller inter-vehicle distance and is a vehicle closer to the own vehicle by comparing the first inter-vehicle distance and the second inter-vehicle distance when the difference between the first inter-vehicle distance and the second inter-vehicle distance is larger than both the first position error radius and the second position error radius, and the arithmetic processing unit calculates a distance to a leading vehicle being an inter-vehicle distance between the own vehicle and the vehicle closer to the own vehicle through use of any of the first inter-vehicle distance and the second inter-vehicle distance wherein
the arithmetic processing unit calculates the distance to the leading vehicle between the own vehicle the first other vehicle or the second other vehicle having a larger one of the first reception level and the second reception level, by subtracting a value, which is obtained by multiplying a coefficient of 1 or less by the first position error radius or the second position error radius, from the first inter-vehicle distance or the second inter-vehicle distance.

2. The inter-vehicle communication device according to claim 1, wherein
the arithmetic processing unit extracts information on the first other vehicle and the second other vehicle through use of data on vehicles that travel in substantially a same orientation as the own vehicle and travel in front of the own vehicle based on the latitude and longitude information on the own vehicle the first other vehicle and the second other vehicle.

3. The inter-vehicle communication device according to claim 1, wherein
the reception level detection unit sets an average value to the first reception level and the second reception level, the average value being obtained by sampling a reception signal of inter-vehicle communication a plurality of times.

4. The inter-vehicle communication device according to claim 1, further comprising
a waveform equalizer configured to correct fading fluctuation of a reception signal of inter-vehicle communication and a delay dispersion detector, wherein
the delay dispersion detector separates a smallest delay dispersion component of the reception signal, detects a signal level of the smallest delay dispersion component, and sets the signal level to the first reception level and the second reception level.

5. The inter-vehicle communication device according to claim 1, further comprising:
a high frequency reception amplifier with variable gain; and
an automatic gain control circuit configured to control an input level of a demodulator within a predetermined range, wherein
the arithmetic processing unit adds a signal obtained by inverting an output signal of the automatic gain control circuit to a value detected by the reception level detection unit, and sets a resultant to the first reception level and the second reception level.

6. The inter-vehicle communication device according to claim 1, wherein
when the first position error radius and the second position error radius that are output from the position information reception unit are indicated with an error ellipsoid, the arithmetic processing unit sets, from a long radius and a short radius of the error ellipsoid, the long radius is set to the first position error radius and the second position error radius.

7. The inter-vehicle communication device according to claim 1, wherein
when the first position error radius and the second position error radius that are output from the position information reception unit are indicated with position dilution of precision (PDOP), the arithmetic processing unit converts the PDOP to the first position error radius and the second position error radius to use.

8. The inter-vehicle communication device according to claim 1; further comprising
a driving assistance control unit configured to perform predetermined processing for controlling driving assistance, wherein
the arithmetic processing unit causes the driving assistance control unit to start processing when the distance to the leading vehicle is lower than a threshold value set in advance.

9. A driving assistance device comprising:
the inter-vehicle communication device according to claim 1; and
a driving assistance control unit configured to perform predetermined processing for controlling driving assistance, wherein
when a distance to a further leading vehicle, which is obtained by adding the difference between the first inter-vehicle distance and the second inter-vehicle distance to the distance to the leading vehicle, is lower than a threshold value set in advance, the arithmetic processing unit causes the driving assistance control unit to start processing.

10. An inter-vehicle communication device for being mounted on a vehicle and wirelessly communicating with other vehicles, the inter-vehicle communication device comprising:
an inter-vehicle communication unit including a reception level detection unit;
a position information reception unit; and
an arithmetic processing unit, wherein
the arithmetic processing unit calculates a first inter-vehicle distance to a first other vehicle through use of latitude and longitude information on the first other vehicle, which is received by the inter-vehicle communication unit, and latitude and longitude information on an own vehicle of the position information reception unit, receives a first position error radius relating to the first other vehicle from the first other vehicle, and acquires a first reception level from the first other vehicle, which is detected by the reception level detection unit, the arithmetic processing unit calculates a second inter-vehicle distance to a second other vehicle through use of latitude and longitude information on the second other vehicle, which is received by the inter-vehicle communication unit, and the latitude and longitude information on the own vehicle of the position information reception unit, receives a second position error radius relating to the second other vehicle from the second other vehicle, and acquires a second reception level from the second other vehicle, which is detected by the reception level detection unit, the arithmetic processing unit determines that the first other vehicle is a vehicle with a larger reception level and is a vehicle closer to the own vehicle by comparing the first reception level and the second reception level when a difference between the first inter-vehicle distance and the second inter-vehicle distance is smaller than any of the first position error radius and the second position error radius, and determines that the second other vehicle is a vehicle with a smaller inter-vehicle distance and is a vehicle closer to the own vehicle by comparing the first inter-vehicle distance and the second inter-vehicle distance when the difference between the first inter-vehicle distance and the second inter-vehicle distance is larger than both the first position error radius and the second position error radius, and the arithmetic processing unit calculates a distance to a leading vehicle being an inter-vehicle distance between the own vehicle and the vehicle closer to the own vehicle through use of any of the first inter-vehicle distance and the second inter-vehicle distance, wherein the arithmetic processing unit calculates the distance to the leading vehicle between the own vehicle and the first other vehicle or the second other vehicle having a larger one of the first reception level and the second reception level by multiplying a ratio of the first reception level and the second reception level by the first inter-vehicle distance or the second inter-vehicle distance.

11. An inter-vehicle communication device for being mounted on a vehicle and wirelessly communicating with other vehicles, the inter-vehicle communication device comprising:

an inter-vehicle communication unit including a reception level detection unit;

a position information reception unit; and an arithmetic processing unit, wherein the arithmetic processing unit calculates a first inter-vehicle distance to a first other vehicle through use of latitude and longitude information on the first other vehicle, which is received by the inter-vehicle communication unit, and latitude and longitude information on an own vehicle of the position information reception unit, receives a first position error radius relating to the first other vehicle from the first other vehicle, and acquires a first reception level from the first other vehicle, which is detected by the reception level detection unit, the arithmetic processing unit calculates a second inter-vehicle distance to a second other vehicle through use of latitude and longitude information on the second other vehicle, which is received by the inter-vehicle communication unit, and the latitude and longitude information on the own vehicle of the position information reception unit, receives a second position error radius relating to the second other vehicle from the second other vehicle, and acquires a second reception level from the second other vehicle, which is detected by the reception level detection unit, the arithmetic processing unit determines that the first other vehicle is a vehicle with a larger reception level and is a vehicle closer to the own vehicle by comparing the first reception level and the second reception level when a difference between the first inter-vehicle distance and the second inter-vehicle distance is smaller than any of the first position error radius and the second position error radius, and determines that the second other vehicle is a vehicle with a smaller inter-vehicle distance and is a vehicle closer to the own vehicle by comparing the first inter-vehicle distance and the second inter-vehicle distance when the difference between the first inter-vehicle distance and the second inter-vehicle distance is larger than both the first position error radius and the second position error radius, and the arithmetic processing unit calculates a distance to a leading vehicle being an inter-vehicle distance between the own vehicle and the vehicle closer to the own vehicle through use of any of the first inter-vehicle distance and the second inter-vehicle distance, the device further comprising:

a null-point detection and correction unit configured to detect a reception null point and correct the first reception level and the second reception level, wherein with regard to the first reception level and the second reception level, in a case that the latitude and longitude information of the first other vehicle or the second other vehicle contained in the received data is included within a predetermined range of the distance to the leading vehicle, the null-point detection and correction unit corrects the first reception level or the second reception level and sets the resultant to a reception level of the first other or the second other vehicle when the reception level of the first other vehicle or the second other vehicle is lower than a predetermined threshold value.

* * * * *